(12) United States Patent
Earl

(10) Patent No.: US 9,537,716 B1
(45) Date of Patent: Jan. 3, 2017

(54) ESTABLISHING A DIRECT CONNECTION BETWEEN REMOTE DEVICES

(75) Inventor: Michael Earl, Lindon, UT (US)

(73) Assignee: Crimson Corporation, Dover, DE (US)

( * ) Notice: Subject to any disclaimer, the term of this patent is extended or adjusted under 35 U.S.C. 154(b) by 216 days.

(21) Appl. No.: 13/525,790

(22) Filed: Jun. 18, 2012

(51) Int. Cl.
*G06F 15/16* (2006.01)
*H04L 12/24* (2006.01)
*H04L 9/08* (2006.01)

(52) U.S. Cl.
CPC ......... *H04L 41/0856* (2013.01); *H04L 9/0855* (2013.01)

(58) Field of Classification Search
CPC .... H04L 67/28; H04L 67/2842; H04L 63/083; H04L 67/06; H04L 65/605; H04L 41/0856; H04L 63/123; H04L 9/0855; H04L 41/085; H04L 9/055; H04L 67/284; H04L 63/08; G06F 17/30864; H04W 48/16; H04W 40/24; H04W 84/042; H04W 88/04
USPC ........................................................ 709/227
See application file for complete search history.

(56) References Cited

U.S. PATENT DOCUMENTS

| | | | |
|---|---|---|---|
| 5,586,261 A * | 12/1996 | Brooks ................... | H04L 45/04 370/401 |
| 7,742,426 B2 * | 6/2010 | Schumacher et al. ........ | 370/248 |
| 2006/0039354 A1 * | 2/2006 | Rao et al. ..................... | 370/352 |
| 2008/0313305 A1 * | 12/2008 | Long .............................. | 709/217 |
| 2011/0187642 A1 * | 8/2011 | Faith ..................... | G06F 1/1694 345/158 |
| 2012/0158862 A1 * | 6/2012 | Mosko et al. ................ | 709/206 |
| 2013/0031608 A1 * | 1/2013 | Alfano .................. | H04L 41/042 726/3 |
| 2013/0086278 A1 * | 4/2013 | Schmidt ........................ | 709/231 |
| 2013/0097528 A1 * | 4/2013 | Armitage ...................... | 715/753 |
| 2013/0198825 A1 * | 8/2013 | Feytons .......................... | 726/6 |
| 2013/0247220 A1 * | 9/2013 | Bingell et al. .................. | 726/28 |
| 2013/0263288 A1 * | 10/2013 | Palanichamy et al. ......... | 726/30 |
| 2015/0139156 A1 * | 5/2015 | Thakur ............... | H04W 76/023 370/329 |

OTHER PUBLICATIONS

Wikipedia, "Remote Desktop Software," as modified Mar. 2, 2012 located at http://en.wikipedia.org/wiki/Remote_desktop_software, printed on Jul. 25, 2012.

* cited by examiner

*Primary Examiner* — Arvin Eskandarnia
(74) *Attorney, Agent, or Firm* — Austin Rapp & Hardman

(57) ABSTRACT

A computing device that is configured to coordinate remote sessions is described. The computing device includes a processor and instructions stored in memory. The computing device establishes a first remote session corresponding to a first node. The computing device further establishes a second remote session corresponding to a second node. The computing device further determines whether to establish a direct link between the first and second nodes. The computing device further establishes a direct link between the first and second nodes if it is determined to establish a direct link.

18 Claims, 9 Drawing Sheets

ESTABLISHING A DIRECT CONNECTION BETWEEN REMOTE DEVICES

TECHNICAL FIELD

The present disclosure relates generally to computers and computer-related technology. More specifically, the present disclosure relates to establishing a direct connection between remote devices.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Many computers may be connected to such networks. These computers are often referred to as nodes. One or more servers or computers may provide data, services and/or may be responsible for managing other computers on the network. A computer network may include hundreds or even thousands of nodes.

Data may often be transferred between nodes on a network. For example, when transferring a file between two nodes on a network, the network may not permit an efficient transfer of data between devices because of network failure or a slow network connection. In some cases, transferring a large file of data over a network may require a lot of bandwidth. As can be observed from this discussion, systems and methods that assist in efficient transfer of data between devices may be beneficial.

DETAILED DESCRIPTION

Figure 1:
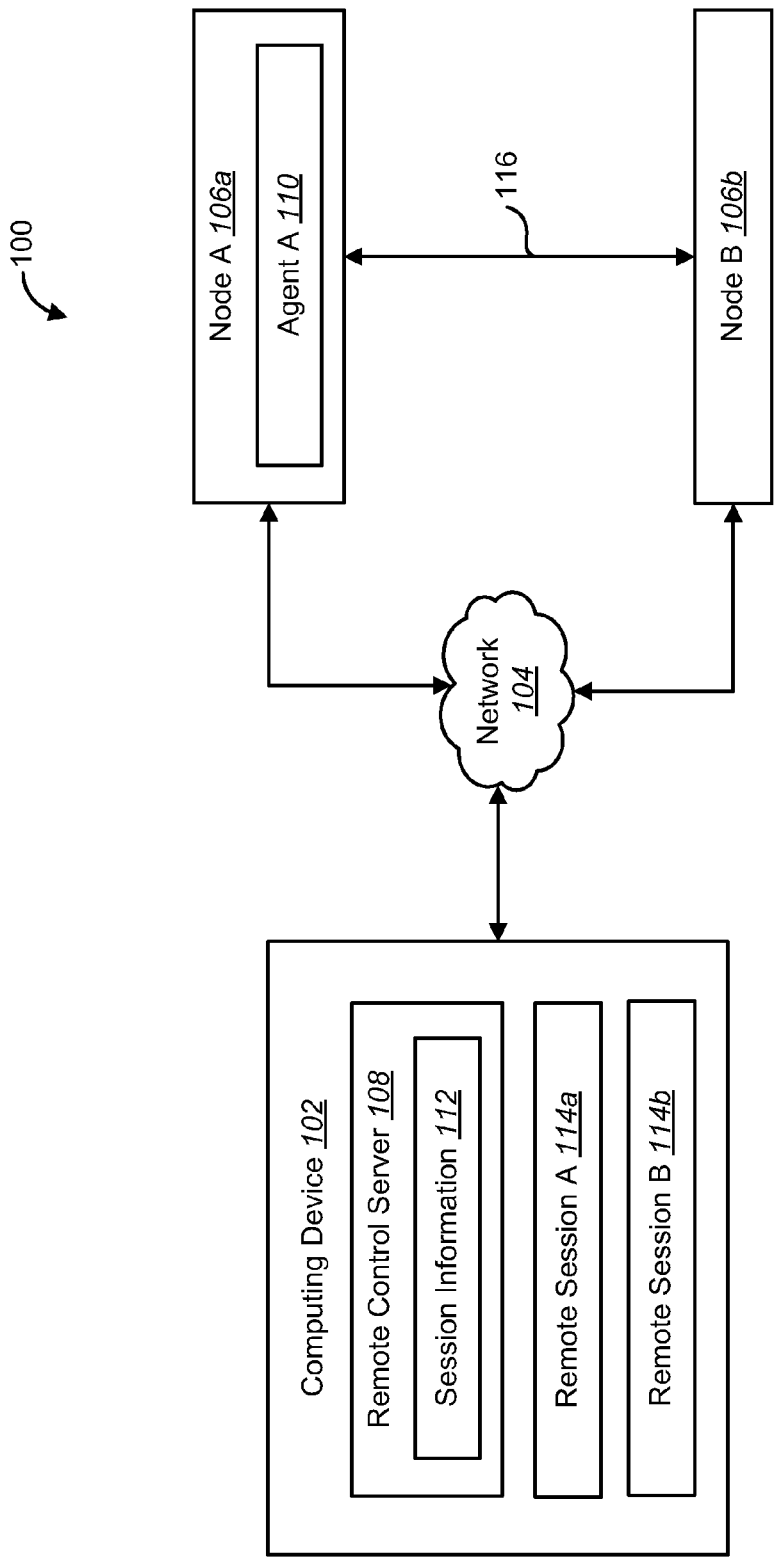
FIG. 1 is a block diagram illustrating one configuration of a system where systems and methods for establishing a direct connection between remote devices may be implemented.

A computing device configured to coordinate remote sessions is described. The computing device includes a processor and instructions stored in memory that is in electronic communication with the processor. The computing device establishes a first remote session corresponding to a first node. The computing device also establishes a second remote session corresponding to a second node. The computing device also determines whether to establish a direct link between the first and second nodes. The computing device also establishes a direct link between the first and second nodes if it is determined to establish a direct link.

Determining whether to establish a direct link between the first and second nodes may include the computing device determining whether the first node and the second node are on at least one of the group consisting of the same domain and the same subnet. Determining whether to establish a direct link between the first and second nodes may include the computing device determining whether the first remote session and the second remote session share a common connection other than the computing device. Determining whether to establish a direct link between the first and second node may include the computing device determining that the first and second nodes share a common network. The computing device may not be in direct communication with the common network. Determining whether to establish a direct link between the first and second nodes may include determining whether a transfer of data satisfies a security criteria.

Establishing a direct link between the first and second nodes may include sending an instruction to the first node to share resource information with the second node. Establishing a direct link between the first and second nodes may include communicating to an agent on the first node remote session information corresponding to the second remote session. The computing device may also send an instruction to the first node to share a file from the first node with the second node over the direct link.

The computing device may establish a virtual link between the first and second remote sessions. The computing device may share data between the first and second remote sessions over the virtual link. The computing device may also instruct the first and second nodes to share data over the direct link corresponding to data shared between the first and second remote sessions.

A method for coordinating remote sessions is also described. The method includes establishing a first remote session corresponding to a first node. The method also includes establishing a second remote session corresponding to a second node. The method also includes determining whether to establish a direct link between the first and second nodes. The method also includes establishing a direct link between the first and second nodes if it is determined to establish a direct link.

A non-transitory tangible computer-readable medium for coordinating remote sessions is also described. The computer-readable medium includes executable instructions for establishing a first remote session corresponding to a first node. The computer-readable medium also includes executable instructions for establishing a second remote session corresponding to a second node. The computer-readable medium also includes executable instructions for determining whether to establish a direct link between the first and second nodes. The computer-readable medium also includes executable instructions for establishing a direct link between the first and second nodes if it is determined to establish a direct link.

The systems and methods disclosed herein describe approaches for establishing a direct connection between remote devices. There is often a need to transfer and/or share data between remote devices. For example, in some cases, multiple remote control (RC) sessions may be created from an RC controller. There are times when the RC controller facilitates the transfer or sharing of data from one RC session to another RC session.

Known systems currently share files between RC sessions by downloading data from one RC session, then copying the data to a shared file and/or sending the data to another RC session over a network. Likewise, if one RC session has a DVD, CD or other setup file to share with another RC session, a similar downloading method with manual and/or sneakware-type effort is used to grant access to other RC sessions. These known systems and approaches may result in long and burdensome downloads and may have a detrimental effect on a network.

In an effort to remedy some of these difficulties, the systems and methods disclosed herein provide an approach for establishing a direct connection between remote devices. For example, to reduce the inefficiency of transferring or sharing data between remote devices of known approaches, a computing device may establish a direct link between RC sessions. Having a link between sessions allows for easier updating of software and sharing files between devices. Further, establishing a link between devices permits sharing and transferring data between devices or obtaining more efficient access to media from a remote location.

Various types of information may be shared between sessions and may be shared based on the type of data or different requirements of devices on the system. A direct link may enable large files to be quickly transferred between devices over a more direct connection. Files such as application installations, operating system patches, application fixes and other similar files are often quite large and may be more efficiently utilized over a direct link. The direct link may also be used to transfer sensitive information between devices that are not allowed on certain networks. A direct link may be used to avoid sending files over an internet connection or other remote connection between remote devices. Where certain restrictions or policies may exist, a file may need to be copied to another computer in the same security context which a controlling computer is not a member. A direct link may be established to enable devices to share large binary files such as video or database information over shared resources and/or via a direct link. Establishing a direct link may enable a controlling computer to send these and other files directly between devices without having direct access to a direct link between devices.

The systems and methods described herein may facilitate more efficient sharing and transferring of data between remote devices by determining whether to establish a link and/or by ultimately establishing a direct link between one or more devices. By allowing direct transfer of data between devices, a host computer or RC controller may provide for direct sharing of data between two or more remote devices.

In some approaches, this is done by providing information regarding remote information sessions and determining whether a direct link is efficient or possible, and then sharing relevant information between devices to enable the direct sharing of data between devices.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system 100 where systems and methods for establishing a direct link 116 between remote devices may be implemented. A computing device 102 and one or more nodes 106 may be connected to a network 104. The computing device 102 and nodes 106 may be implemented as servers, personal computers (PCs), mobile devices or other kinds of computing devices. The computing device 102 may include a remote control server 108 and remote session information 112. The remote control server 108 may be a hardware and/or software module used to establish and/or manage remote sessions 114 between the computing device 102 and one or more nodes 106. In one example, the computing device 102 establishes a first remote session 114a corresponding to a first node 106a and a second remote session 114b corresponding to a second node 106b.

The computing device 102 may communicate with nodes 106 over a network 104. The network 104 may be a computer network such as a Local Area Network (LAN), Wide Area Network (WAN), Internet, Intranet, or other medium for transferring data between various devices. In various configurations, any number of devices, including computing devices and nodes may be connected to the network 104. In some configurations, remote sessions 114 may be hosted over the network 104 and information about remote sessions 114 may be shared between devices.

In one configuration, node A 106a includes an agent 110. The agent 110 may include hardware and/or software installed or otherwise implemented by the computing device 102. The agent 110 may be configured to receive and process instructions from the computing device 102 and/or interact with the remote control server 108. For example, the agent 110 may be installed on a node 106 to interface with the remote control server 108 and receive instructions regarding remote session A 114a. The agent 110 may further be configured to receive and process instructions regarding remote session B 114b.

In one configuration, the computing device 102 establishes remote session A 114a corresponding to node A 106a. The computing device 102 further establishes remote session B 114b corresponding to node B 106b. The computing device 102 is configured to determine whether to establish a direct link 116 between node A 106a and node B 106b. The direct link 116 may be any link between node A 106a and node B 106b that does not pass through the computing device 102. In one example, the direct link 116 may be a link via a network other than the network 104 between the computing device 102 and the nodes 106. For instance, the direct link 116 may be via a LAN that connects node A 106a and node B 106b without passing through the network 104.

In other words, the direct link 116 may be over a second network that connects node A 106a and node B 106b. For instance, the network 104 may be the Internet and the direct link 116 may be provided by a LAN that connects node A 106a and node B 106b. In another example, the direct link 116 may be a link between node A 106a and node B 106b through the network 104 without passing through the computing device 102. For instance, a file may be transferred via the direct link 116 between node A 106a and node B 106b without downloading the file to the computing device 102 and then uploading it from the computing device 102. Other examples of a direct link 116 may include other connections between one or more nodes.

If it is determined to establish a direct link 116, the computing device 102 may further be configured to establish the direct link 116 between node A 106a and node B 106b. In one example, establishing a direct link 116 may include sharing resources between remote session A 114a and remote session B 114b. In one configuration, this may include sharing information about one or both of the remote sessions 114a-b with an agent 110 on node A 106a. In some configurations, the direct link 116 may be established by sending instructions to the agent 110 to make data available or visible from node A 106a to node B 106b over the direct link 116. In another configuration, the direct link 116 may be established by instructing node A 106a and/or node B 106b to share resource information or grant access to files, folders and other data to each other over the direct link 116. In some configurations, multiple direct links 116 may be established between one or more nodes 106a-b and one or more nodes not illustrated in FIG. 1.

Figure 2:
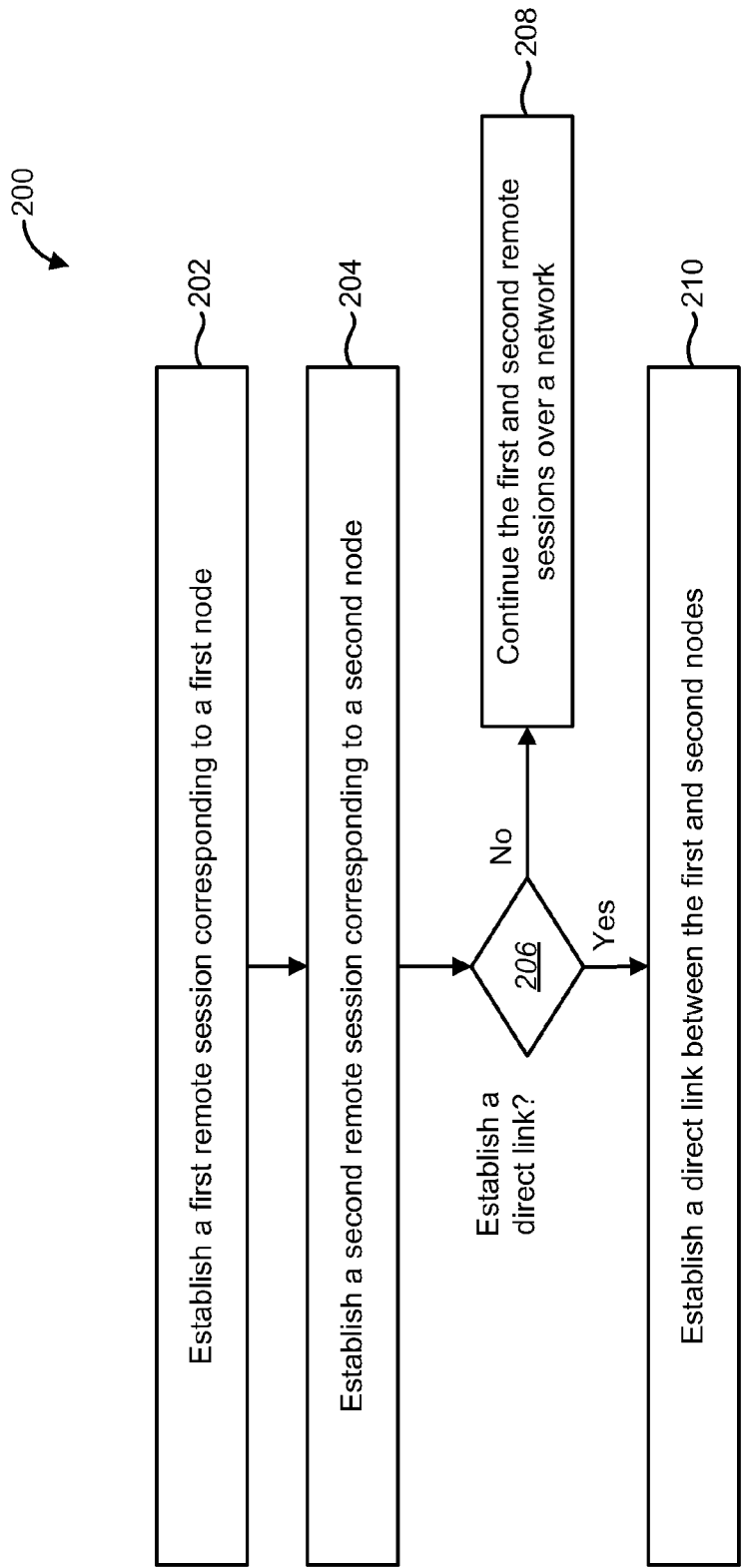
FIG. 2 is a flow diagram illustrating one configuration of a method for establishing a direct connection between remote devices.

FIG. 2 is a flow diagram illustrating one configuration of a method 200 for establishing a direct connection between remote devices. The computing device 102 may establish 202 a first remote session 114a corresponding to a first node 106a. Establishing a first remote session 114a permits a computing device 102 to perform certain operations and processes on a node 106a without being physically present at the node 106a. For example, in a remote session 114a corresponding with node A 106a, a computing device 102 may instruct node A 106a to delete, create, move, update, execute, install or download data or other files on the node 106a. Further, the computing device 102 may be configured to instruct node A 106a to perform any operations as instructed by the computing device 102.

The computing device 102 may further establish 204 a second remote session 114b corresponding to a second node 106b. In some configurations, the second remote session 114b may be established in a similar way to remote session 114a. Further, the second remote session 114b may be substantially similar to the first remote session 114a. For example, remote session A 114a may be a remote session granting full access to node A 106a while remote session B 114b may grant the computing device 102 a similar level of access to node B 106b. Conversely, remote session A 114a and remote session B 114b may be different types of remote sessions 114, granting different levels of access to the computing device 102 to each corresponding node 106. One example of a remote session 114 may include an active mode session granting total access to a node 106. Another example of a remote session 114 may include a monitor mode session granting visibility of a node 106 without access to perform certain operations on files or other data. Another example of a remote session 114 may include a file transfer session allowing transferring of files on a node 106 or to the computing device 102 or other remote session 114 also granting varying levels of access to the node 106. Other types of access may include access to perform varying functions, such as delete, create, update, download, execute or a combination of these and other functions to be processed or performed by the node 106.

The computing device 102 may determine 206 whether to establish a direct link 116 between the first and second nodes 106. Determining whether to establish a direct link 116 may be based on one or more factors. In one example, the computing device 102 may determine to establish a direct link 116 if a capability exists to establish a direct link 116 between the nodes 106. In another example, the computing device 102 may determine to establish a direct link 116 if the nodes 106 are on a similar domain and/or subnet. In another example, the computing device 102 may determine to establish a direct link 116 if the first and second nodes 106 share a similar network or connection that does not pass through the computing device 102. In one configuration, determining whether to establish a direct link 116 between the first and second nodes 106 may be based on session information 112, including whether the remote session 114 corresponding to each of the nodes 106 are both connected to or being hosted by the computing device 102. Other factors for determining whether to establish a direct link 116 may be based on overall burden on the network 104, connection speed of the direct link 116, availability of a direct link 116, other session information 112, availability of an agent 110 on one or more of the nodes 106, user preference or other predetermined factors. In some configurations, the computing device 102 may be configured to determine whether to establish a direct link 116 based on one or more factors, such as type of data, amount of data, security considerations, speed of transmission over the network 104 or other factors.

A computing device 102 may consider a variety of factors in determining whether to establish a direct link 116 between the first and second nodes 106 may be security or perceived security over the network 104. Where the remote session 114 is established over the network 104, there may be certain security issues involved with sending data or other files between the computing device 102 and/or between one or more nodes 106 over the network 104. The computing device 102 may determine whether or not a transfer of data between a computing device 102 and/or between a first and second node 106 satisfies a certain security criteria (e.g., set of criteria). For example, the computing device 102 and/or agent 110 may determine that a network 104 or other connection is insecure or lacks certain security credentials or policies in considering whether to establish a direct link 116 between a first and second node 106. The computing device 102 and/or agent 110 may also consider the content or settings of a file or other data in determining whether to establish a direct link 116 between a first and second node 106 (e.g., whether a file is permitted to be transferred from a device or network). The computing device 102 may also determine and consider the possibility of certain files to be offloaded to a remote device at any point in the transfer of data over a network 104 in determining whether to establish a direct link 116 between a first and second node 106. In some configurations, the computing device 102 may determine 206 to establish a direct link 116 if a security criteria related to a file and/or network 104 is not satisfied (e.g., the network 104 is insecure). Additionally or alternatively, the computing device 102 may determine 206 to establish a direct link 116 if a security criteria related to a file and/or one or more nodes 106 is satisfied (e.g., a file is authorized to be transferred between nodes 106).

If the computing device 102 determines 206 to establish a direct link 116 based on one or more predefined factors, the computing device 102 may establish 210 the direct link 116 between one or more nodes. In one example, when viewing data from node A 106a on remote session A 114a, the view of the data as seen on remote session A 114a will be from the perspective of node A 106a. In this example, depending on the level of access granted or type of remote session 114, information on node A 106a would be directly accessible over remote session A 114a. Where a direct link 116 is established between node A 106a and node B 106b, it would be possible to transfer or otherwise share data from node A 106a to node B 106b over the direct link 116 rather than through the computing device 102. Where a direct link 116 is established, resources, files, and other data may be shared or distributed between node A 106a and node B 106b over the direct link 116.

In some configurations, establishing 210 a direct link 116 may include sending instructions to a node 106 to transfer or share files or data between node A 106a and node B 106b over the direct link 116 rather than through the computing device 102. In another configuration, establishing 210 a direct link 116 may include instructing node A 106a to share resource information with node B 106b and permit node B 106b to directly access information, folders, ports, and other data directly from node A 106a. In some configurations, the direct link 116 may be established from node A 106a to node B 106b or vice versa from node B 106b to node A 106a. In another configuration, some or all of the nodes 106 connected by a direct link 116 may be instructed to share resource information between one or more nodes 106 in any direction over a direct link 116. In some configurations, the computing device 102 may recognize which nodes 106 are part of each remote session 114 and instruct the nodes 106 to use the direct link 116 whenever files, folders, resources or other data is transferred between nodes 106 on a remote session 114 if possible. For example, if it is determined that node A 106a and node B 106b are on a similar subnet, LAN or other network separate from the network 104, the remote control server 108 may be configured to instruct the nodes 106 to use the direct link 116 when files are transferred between remote session A 114a and remote session B 114b. In some configurations, the remote control server 108 is configured to establish a direct link 116 by communicating specific instructions or by sharing session information 112 with an agent 110 on one or more of the nodes 106.

In some configurations, where the computing device 102 determines 206 not to establish a direct link 116, the computing device 102 may be configured to continue 208 the first and second remote sessions 114 over the network 104. In some configurations, the computing device 102 may direct the agents 110 to transmit or share data between node A 106a and node B 106b by sending or sharing files, folders, resources or other data through the computing device 102 rather than over a direct link 116. In other configurations, the computing device 102 may direct the first and second nodes 106 to discontinue each of the corresponding remote sessions 114. In one configuration, the computing device 102 may be configured to continue monitoring whether or not to establish a direct link 116 by repeating the method 200 and/or certain steps of the method 200.

Figure 3:
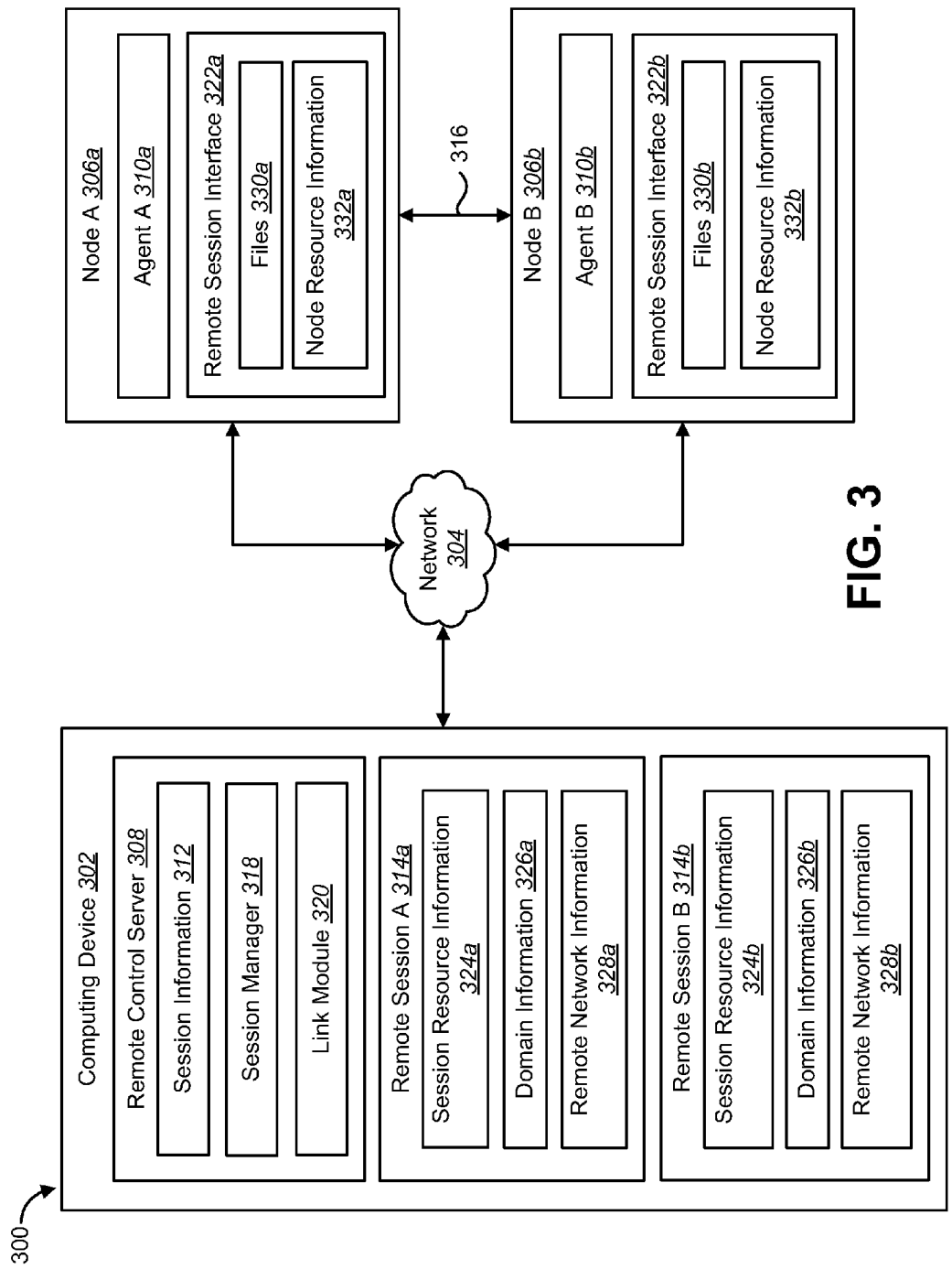
FIG. 3 is a block diagram illustrating a more specific configuration of a system where systems and methods for establishing a direct connection between remote devices may be implemented.

FIG. 3 is a block diagram illustrating a more specific configuration of a system 300 where systems and methods for establishing a direct connection between remote devices may be implemented. The system 300 includes a computing device 302 in communication with one or more nodes 306 over a network 304. In some configurations, the nodes 306 and computing device 302 may include similar implementations of nodes and computing devices described herein.

The computing device 302 may include a remote control server 308. The remote control server 308 may include a hardware and/or software module used to establish and/or manage remote sessions 114 and establish a direct link 316 between one or more nodes 306. Further, the remote control server 308 may include similar elements to other remote control servers described herein. In one configuration, the remote control server 308 may be configured to install and/or configure an agent 310 on one or more nodes 306. The agent 310 may be a hardware and/or software module for receiving instructions from a remote control server 308 or computing device 302. Additionally or alternatively, the remote control server 308 may be configured to interact with agent A 310a on node A 306a. In another example, the remote control server 308 is configured to interact with agent B 310b on node B 306b. Other configurations may include interacting with any number of agents 310 on one or more nodes 306. Interacting with an agent 310 may include sending instructions, updates or other information over a network 304.

In some configurations, the computing device 302 may further include one or more remote sessions 314. For example, the computing device 302 may include and/or host remote session A 314a corresponding to node A 306a. Remote session A 314a may include session resource information 324a, domain information 326a, and remote network information 328a. The computing device 302 may further include and/or host remote session B 314b corresponding to node B 306b. Similar to remote session A 314a, remote session B 314b may include session resource information 324b, domain information 326b, and remote network information 328b. The remote control server 308 may additionally communicate with and/or access information from each remote session 314.

The system 300 may include one or more nodes 306 in communication with the computing device 302 over a network 304. Each of the nodes 306 may correspond to a number of remote sessions 314. In one example, the system 300 includes node A 306a and node B 306b. Node A 306a may include an agent 310a and a remote session interface 322a. The agent 310a may interact with the computing device 302 through the remote control server 308. In one configuration, the agent 310a may be configured to download or install software and other data on node A 306a. In some configurations, the agent 310a may perform some or all of the functions similar to other agents 310 described herein. The remote session interface 322a may include files 330a, node resource information 332a and/or other data related to node A 306a that may be utilized to establish a direct link 316 between one or more nodes. In some configurations, the remote session interface 322a may include a view of files 330a on node A 306a or other files 330a visible to node A 306a on the remote session 314a that may be shared over a direct link 316. In one example, the files 330a of the remote session interface 322a may include files that are visible or available over the direct link 316, including files from node B 306b and other nodes that may be capable of using the direct link 316. In some configurations, these files may be transmitted or shared via one or more direct links 316 established by the computing device 302. The remote session interface 322a may further include node resource information 332a. For example, the node resource information 332a may include resource information about node A 306a, node B 306b or another device in communication with node A 306a. In some configurations, the remote session interface 322a may further include information about the remote session 314, including some or all of the session resource information 324, domain information 326 or any other information that may be useful for determining whether to establish a direct link 316 between one or more nodes 306.

In one configuration, node B 306b may include some or all of the same components as node A 306a. For example, node B 306b may include agent B 310b and a remote session interface 322b. Agent B 310b may be configured to interact with the remote control server 308 or other components on the computing device 302. The agent 310b may further be configured to communicate or otherwise interact with agent A 310a or other components on node A 306a. For example, in one configuration, the computing device 302 may install an agent 310 on each of nodes A and B 306a, 306b as preparation or implementation of establishing a direct link 316 between node A 306a and node B 306b. The remote session interface 322b may also include files 330b specific to or otherwise visible to node B 306b and node resource information 332b corresponding to node B 306b. Further, agent B 310b may also perform similar functions to other agents described herein.

The remote control server 308 may be configured to perform several functions. In one configuration, the remote control server 308 includes a session manager 318. The session manager 318 may be configured to establish a remote session 314 between the computing device 302 and a node 306 over a network 304. In some configurations, the session manager 318 may obtain session information 312 for establishing a remote session 314. The session manager 318 may further obtain session information 312 from an established remote session 314. In one example, the session manager 318 may establish remote session A 314a and remote session B 314b respectively corresponding to node A 306a and node B 306b. In some configurations, the session manager 318 may be configured to send instructions to an agent 310 on a node 306 for establishing a remote session 314 or to provide the node 306 with information about the remote session 314 or other devices in one or more remotes sessions 314 with the computing device 306.

The session manager 318 may further be configured to provide session information 312 to one or more nodes 306. In some configurations, the session manager 318 may determine whether one or more nodes 306 in a first remote session 314 share a server, common network or other common connection with one or more nodes 306 corresponding to a second remote session 314. For example, the session manger 318 may be configured to determine if node A 306a in remote session A 314a shares a common domain with node B 306b in remote session B 314b. In another example, the session manager 318 may determine whether node A 306a and node B 306b share a common network other than the network 304 with the computing device 302. In some examples, a common network may be an Intranet, Internet, cable connection, LAN, WAN, or connection between one or more nodes.

The remote control server 308 may further include a link module 320. In one configuration, the link module 320 may be configured to determine whether to establish a direct link 316 between one or more nodes 306. Determining whether to establish a direct link 316 may be based on one or more factors. For example, the link module 320 may determine whether a capability exists to establish a direct link 316 between one or more nodes 306. In another example, the link module 320 may obtain session information 312 or other data from one or more remote sessions 314 or from the session manager 318 to determine whether one or more nodes 306 are on a similar domain, local network or other connection shared between one or more nodes 306. In one example, the link module 320 may determine whether to establish a direct link 316 based on whether one or more nodes 306 share a common computing device 302 or network 304 between one or more remote sessions 314. For example, where node A 306a and node B 306b are in two different remote sessions 314 originating from the same computing device 302, the link module 320 may determine that node A 306a and node B 306b have relevant session information 312 in common and determine to establish a direct link 316 between node A 306a and node B 306b.

In some configurations, the link module 320 downloads or creates the criteria used by the computing device 302 for determining whether to establish a direct link 316 between one or more nodes 306. The link module 320 may further be configured to process instructions and/or criteria for determining whether to establish a direct link 316. The link module 320 may obtain relevant information for making this determination from the session information 312, session manager 318, one or more remote sessions 314 hosted by the computing device 302 and/or an agent 310 on one or more nodes 306. In some configurations, the link module 320 may obtain this information from other available sources. In one example, the link module 320 may be configured to send instructions or criteria to an agent 310 on a node 306. The agent 310 may be configured to process instructions from the link module 320 for determining whether to establish a direct link 316. In some configurations, the link module 320 may determine whether to establish a direct link 316 based on one or a combination of several criteria, including those examples described herein.

In some configurations, the link module 320 may be configured to establish a direct link 316 between one or more nodes 306. In some configurations, a direct link 316 may be established via a LAN, WAN, Intranet, Internet or other network or connection between one or more nodes. Further, the direct link 316 may be established via any connection between one or more nodes that does not pass through the intervening computing device 302. In some examples, establishing a direct link 316 may include sharing resource data between nodes, transferring files over a common network or connection, sharing session information 312 between one or more agents or otherwise communicating or making data available to one or more nodes 306 over a common connection between nodes. Establishing a direct link 316 may further include other examples.

The remote control server 308 may be configured to obtain and maintain session information 312 for one or more remote sessions 314. In some configurations, the session information 312 may contain information about a remote session 314 or information corresponding to a node 306 in a remote session 314. For example, session information 312 may include session resource information 324, domain information 326, remote network information 328 or other information related to a remote session 314 or one or more nodes 306. In some configurations, the remote control server 308 may be configured to obtain session information 312 from one or more remote sessions 314. The session information 312 may be obtained from data on the computing device 302 or on a remote device on a network 304 with data corresponding to one or more remote sessions 314. In some configurations, the session information 312 may be obtained from one or more nodes 306 corresponding to each of the one or more remote sessions 314. In some configurations, the remote control server 308 may gather information from one or more remote sessions 314.

In some configurations, the remote control server 308 may be configured to share session information 312 between remote sessions 314 or between nodes 306. In some configurations, sharing session information 312 is performed between remote sessions 314 on the computing device 302. In some configurations, the session information 312 may be shared between nodes 306 pursuant to instructions sent from the remote control server 308 to one or more agents 310 corresponding to one or more nodes 306.

In some configurations, session information 312 may include any information related to one or more remote sessions 314. One example of session information 312 may include information related to the host or source of a remote session 314. Another example of session information 312 may include information related to one or more nodes or other devices participating in a remote session 314. Further, session information 312 may include a session identification (Session ID), IP address, authentication information, resource information 324, domain information 326 and/or remote network information 328. Session information 312 may further include additional or alternative kinds of information.

In some configurations, a remote session 314 may include session resource information 324. In one example, session resource information 324 may include drives, ports and other resources of a device visible to a computing device 302 or other host device in a remote session 314. In some configurations, this may include files, drives and other information on a node 306 visible from the computing device 302. The session resource information 324 on the remote session 314 may correspond to node resource information 332 on a corresponding node 306. For example, remote session A 314a may include session resource information 324a known to the computing device 302. Node A 306a corresponding to remote session A 314a may include some or all of the session resource information 324a accessible to or known to the computing device 302 in addition to node resource information 332a and other information known to node A 306a. In addition to sharing node resource information 332, node A 306a may be configured to share, transmit and/or receive files 330a or other data from node A 306a to node B 306b over the direct link 316. Node B 306b may additionally or alternatively be configured to share, transmit and/or receive files 330b or other data from node B 306b to node A 306a over the direct link 316. In some examples, files 330 and node resource information 332 may be shared in one direction over the direct link 316. In other configurations, each of the nodes 306 may share or transmit files 330 and/or node resource information 332 over a direct link 316 between any of the nodes 306 with access to the direct link 316. In some configurations, the computing device 302a may be configured to share session resource information 324 or other data between remote sessions 314 for determining whether to establish and implement a direct link 316 between one or more nodes 306. In another configuration, the computing device 302 may instruct an agent 310 on a node to share node resource information 332 or other data with another node 306 in determining whether to establish a direct link 316 between one or more nodes 306.

One or more remote sessions 314 may further include domain information 326 corresponding to the domain of one or more nodes 306 in communication with the computing device 302. For example, a remote control server 308 may obtain domain information 326a from remote session A 314a and determine that node A 306a is using a certain domain. The remote control server 308 may further obtain domain information 326b from remote session B 314b and determine whether node B 306b is on the same domain as node A 306a. The computing device 302 may use this domain information 326 to determine whether to establish a direct link 316 between one or more nodes 306 using or sharing a similar domain.

One or more remote sessions 314 may further include remote network information 328 corresponding to a connection or second network between one or more nodes other than the network 304 connecting the computing device 302 and each of the nodes 306. In one example, the remote control server 308 may obtain remote network information 328a from resource session A 314a and determine that node A 306a is using or is capable of using another connection to one or more other devices. The remote control server 308 may further obtain remote network information 328 from remote session B 314b and determine that node B 306b is using or is capable of using the same connection or network as node A 306a. The computing device 302 may use this remote network information 328 to determine whether to establish and implement a direct link 316 between one or more nodes using the second network or alternative connection.

Figure 4:
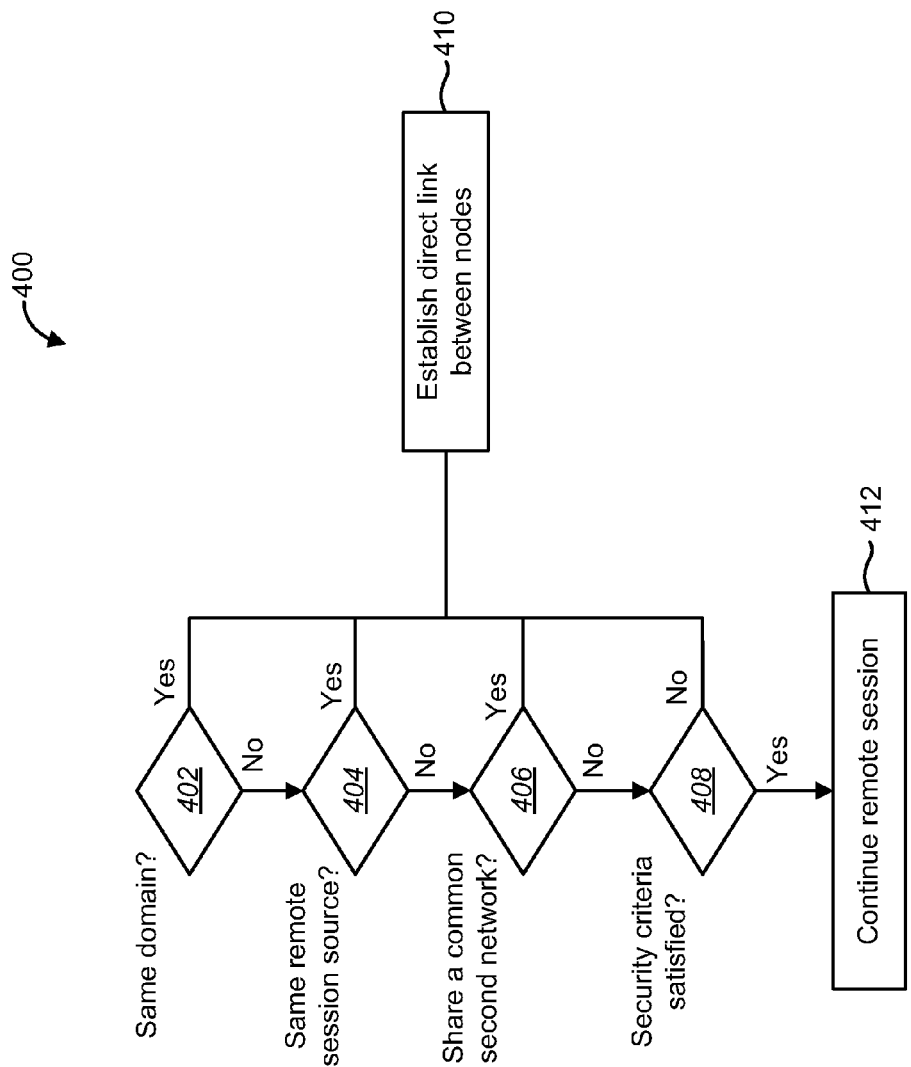
FIG. 4 is a flow diagram illustrating another configuration of a method for establishing a direct connection between remote devices.

FIG. 4 is a flow diagram illustrating another configuration of a method 400 for establishing a direct link 316 between remote devices. The computing device 302 may determine 402 whether a first and second node are on the same domain. Additionally or alternatively, the computing device 302 may determine 402 whether a first and second node are on the same subnet. For example, the remote control server 308 may be configured to determine whether node A 306a corresponding to remote session A 314a is on a specific domain (and/or subnet, for instance). The remote control server 308 may also be configured to determine whether node B 306b corresponding to remote session B 314b is on the same domain (and/or same subnet, for example). If the first and second nodes 306 are on the same domain (and/or subnet), the computing device 302 may be configured to establish 410 a direct link 316 between one or more nodes 306. Further, the computing device 302 may be configured to establish 410 one or more direct links 316 between any number of nodes 306 on the same domain (and/or subnet). In one configuration, where one node 306 corresponds to a first remote session 314, the computing device may establish a direct link 316 between the node 306 and any number of nodes on the same domain if it is determined that the node 306 has access to or visibility of resource information for establishing the direct link 316 between the node 306 in the remote session 314 and other nodes on the same domain.

The computing device 302 may determine 404 whether a first and second node share the same remote session source. For example, if a computing device 302 is hosting or participating in two or more remote sessions 314, the remote control server 308 may be configured to determine that the computing device 302 is a host or source of one or more nodes 306 with the possibility of coordinating between remote sessions 314. In some configurations, the remote control server 308 my determine whether one or more nodes share the same remote source session by sending session information 312 and/or a signal to an agent 310 on a node 306 with an indication or instructions for determining whether one or more nodes 306 share a common source between remote sessions 314. Upon determining that one or more nodes corresponding to one or more remote sessions share a common session source, the remote control server 308 may be configured to establish 410 a direct link 316 between the one or more nodes. In some configurations, the computing device 302 may be configured to create and send instructions to an agent 310 on a node 306 to establish the direct link 316 between the nodes 306.

The computing device 302 may further determine 406 whether a first and second node share a common second network or connection separate from the network 304 between the computing device 302 and each of the nodes 306. For example, in one configuration, node A 306a participates in remote session A 314a over the network 306. Node A 306a further communicates with node B 306b on a common connection (e.g., LAN, subnet) or other connection between the nodes 306a-b. The computing device 302 may be configured to determine that node A 306a and node B 306b share a common second network or subnet. In some examples, the computing device 302 may make this determination by obtaining remote network information 328 from a remote session 314 corresponding to one or more nodes 306. In another example, the computing device 302 may determine whether one or more nodes share a common second network by scanning or querying the session information 312 available to the computing device 302 or remote nodes 306. If it is determined that one or more nodes 306 corresponding to one or more remote sessions 314 share a common second network or other connection, the computing device 306 may be configured to establish 410 a direct link 316 between the nodes 306. In this example, the direct link 316 may be established via the common second network shared by the remote nodes 306.

The computing device 302 may determine 408 whether a transfer of data between a computing device 302 and/or between a first node 306a and a second node 306b is secure or not. For example, the computing device 302 may consider any factors related to the security of a network 304 or information to be shared (e.g., resource information, files) between one or more nodes 306. A computing device 302 and/or agent 310 may determine whether a network 304 or other connection is insecure or lacks certain security credentials or polices in considering whether to establish a direct link 316 between a first node 306a and a second node 306b. The computing device 302 and/or agent 310 may consider the content or settings of a file or other piece of data in determining whether to establish a direct link 316 between the first node 306a and the second node 306b (e.g., whether a file is permitted to be transferred from a device or network). The computing device 302 may also determine and consider the possibility of certain files to be offloaded to a remote device at any point in the transfer of data in determining whether to establish a direct link 316 between a first and second node 306. In some configurations, the computing device 102 may determine 206 to establish a direct link 116 if a security criteria related to a file and/or network 104 is not satisfied (e.g., the network 104 is insecure). Additionally or alternatively, the computing device 102 may determine 206 to establish a direct link 116 if a security criteria related to a file and/or one or more nodes 106 is satisfied (e.g., a file is authorized to be transferred between nodes 106).

The computing device 302 may further be configured to use several criteria in determining whether to establish a direct link 316 between devices. Example of criteria used to determine whether to establish a link include whether the nodes 306 are using the same domain, whether the nodes 306 have the same session source and whether the nodes 306 share a common second network. Some other examples of criteria may include identification information of the computing device 302 or nodes 306, specifications of devices on the network 304 or capability of establishing a direct link 316. In other configurations, any type of predetermined criteria may be used to determine whether to establish a direct link 316 between devices. The computing device 302 may determine to establish 410 a direct link 316 between devices based on one or a combination of factors.

If it is determined that one or more criteria are not met for establishing a direct link 316 between a first and second node, the computing device may be configured to continue 412 the remote session 314 between the computing device 302 and corresponding node 306. In other configurations, the computing device 302 may be configured to do a variety of operations if one or more predetermined criteria are not met for establishing a direct link 316. For example, the computing device 302 may be configured to repeat one or more operations of the illustrated method 400 for determining whether the status of one or more criteria has changed. In another example, the computing device 302 may be configured determine whether other criteria are applicable in determining whether to establish a direct link 316. In another configuration, the computing device 306 may be configured to end the remote session 314 upon a determination not to establish a direct link 316 between one or more nodes 306.

Figure 5:
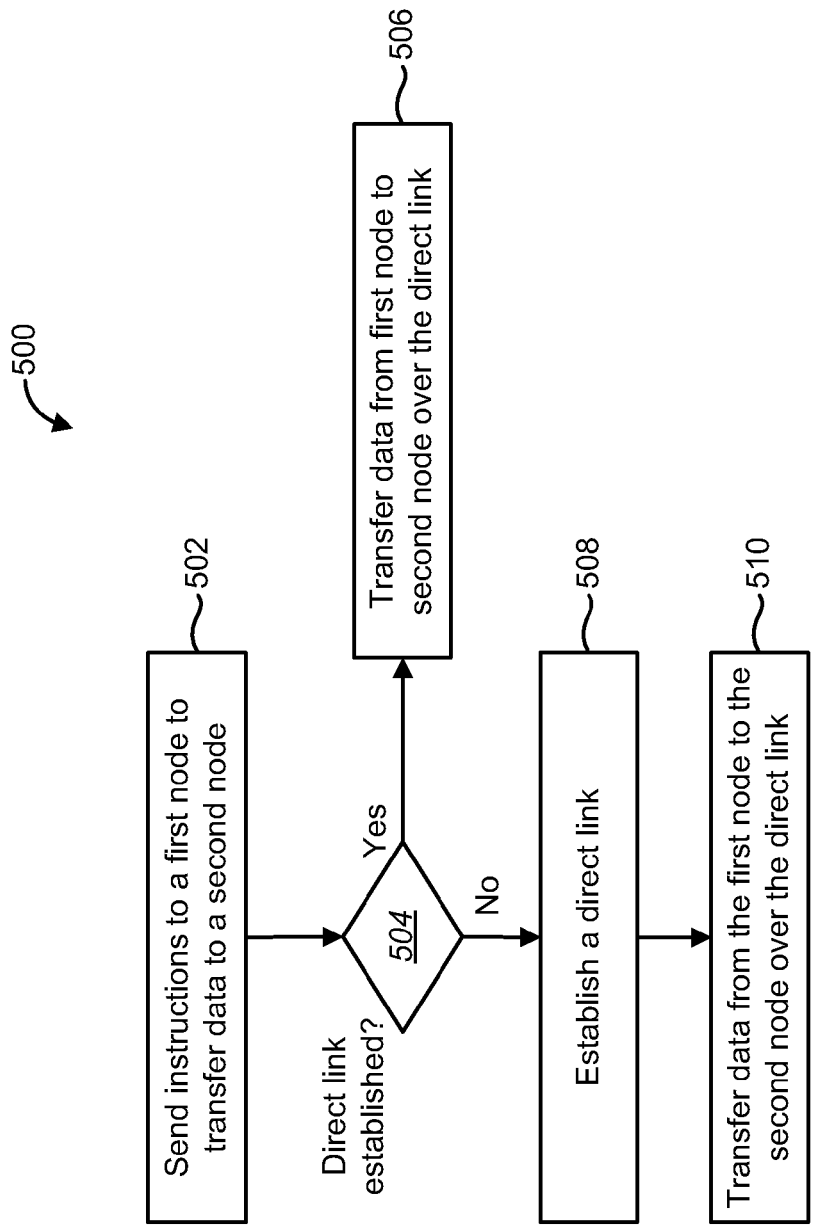
FIG. 5 is a flow diagram illustrating another configuration of a method for establishing a direct connection between remote devices.

FIG. 5 is a flow diagram illustrating another configuration of a method 500 for establishing a direct link 316 between remote devices. The computing device 306 may be configured to send 502 instructions to a first node to transfer data to a second node. The computing device 306 may be configured to send these instructions to an agent 310 on a node 306 corresponding to a remote session 314. In one configuration, sending the instructions for transferring or sharing data from one node to another occurs prior to or part of establishing a direct link 316 between one or more nodes 306. For example, the computing device 302 may be configured to send instructions to node A 306a to send files 330a or share resource information 332a with node B 306b. In one example, the computing device 302 may send these instructions without knowing whether a direct link 316 is established between node A 306a and node B 306b.

In one configuration, the computing device may determine 504 whether a direct link 316 is established between a first and second node. If it is determined that a direct link 316 has already been established, the computing device 302 may be configured to instruct the first node to transfer 506 data from the first node to the second node over the direct link 316. In some configurations, an agent 310 on the first or second node may be configured to share resource information 332 or make files 330 or other data available to be shared or transmitted over the direct link 316 in response to the computing device 302 sending instructions to one or more nodes to share or transmit data to another node. Sharing data over a direct link 316 may be performed similar to examples described herein.

If it is determined that a direct link 316 has not been established, the computing device 302 may be configured to establish 508 a direct link 316 between the first and second nodes. In some configurations, the computing device 302 may determine whether to establish a direct link using some similar criteria to other configurations described herein. Further, establishing a direct link 316 between the first and second nodes may be performed similarly to other examples described herein. The first node may be configured to transfer 510 data from the first node to the second node over the direct link 316. In some configurations, processing the instructions sent to the first node, including establishing a direct link 316 and transferring data from the first node to the second node is performed at least in part by an agent 310 installed on one or more nodes. In some configurations, the agent 310 may be configured to determine whether a direct link 316 should be established and receive instructions from a computing device 302 to establish a direct link 316 between nodes.

Figure 6:
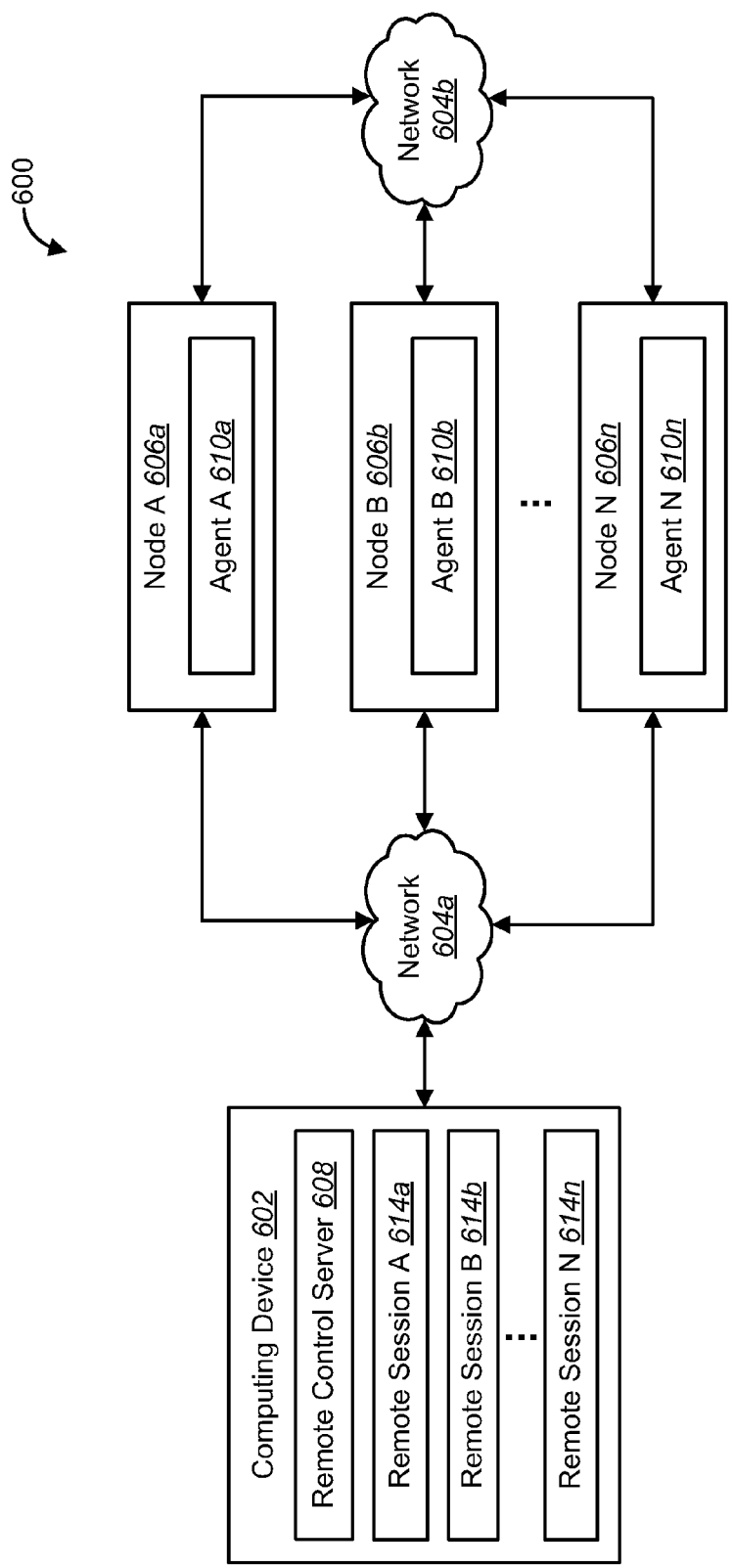
FIG. 6 is a block diagram illustrating one configuration of a system where systems and methods for establishing a direct connection between remote devices may be implemented.

FIG. 6 is a block diagram illustrating one configuration of a system 600 where systems and methods for establishing a direct connection between remote devices may be implemented. In one configuration, the computing device 602 includes a remote control server 608. In some configurations, the remote control server 608 may include similar elements to other remote control servers 608 described herein. The computing device 602 may further include one or more remote sessions 614. In one example, the computing device 602 includes remote session A 614a and remote session B 614b. In other configurations, the computing device 602 may include remote sessions A-N 614a-n.

In some configurations, some or all of the remote sessions A-N 614a-n may have a corresponding node 606a-n in a remote session 614 with the computing device 602. In some configurations, the system 600 may include any number of nodes 606a-n in communication with the computing device 302 over a first network 604a. For example, the node A 606a may be in remote session A 614a hosted by the computing device 602. Node B 606b may be in remote session B 614b hosted by the same computing device 602. In another configuration, the computing device 602 may or participate in any number of remote sessions 614a-n with any number of nodes 606a-n corresponding to each remote sessions 614. Further, some or all of nodes A-N 606a-n may include an agent 610 installed on each node 606. For example, agent A 610a may be installed on node A 606a and agent B 610b may be installed on node B 606b. In one configuration, each of the nodes A-N 606a-n may include a corresponding agent A-N 610a-n with similar or different instructions corresponding to each node 606.

In one configuration, the system 600 may include a first network 604a connecting the computing device 602 and one or more nodes 606. The system 600 may further include a second network 604b or any type of communications connection between each of the nodes 606. In some configurations, the computing device 602 may establish a direct link between nodes A-N 606a-n through the second network 604b. In some configurations, the second network 604b may be any type of network or subnet shared between one or more nodes 606 such as a LAN, WAN, Internet, Intranet, or other medium for transferring data between each of the nodes 606. The second network 604b may include other types of networks and/or subnets for transferring, sharing and/or receiving data between one or more nodes without passing the data through the computing device 602.

In some configurations, the computing device 602 may determine whether or not to establish a direct link between one or more nodes based on the relative speed of communicating over the first network 604a or second network 604b. For example, if the computing device 602 determines that transferring or sharing data over the network B 604b rather than network A 604a, the computing device 602 may use this criteria to establish a direct link as network B 604b. In other configurations, the second network 604b may be any other connection between one or more nodes, and be established in response to meeting certain predetermined criteria. Examples of predetermined criteria used in determining whether to establish a direct link may include whether the proposed direct link would permit faster or more efficient sharing of data between nodes. The computing device 602 may further use other criteria for determine whether to establish a direct link, including those discussed herein.

Figure 7:
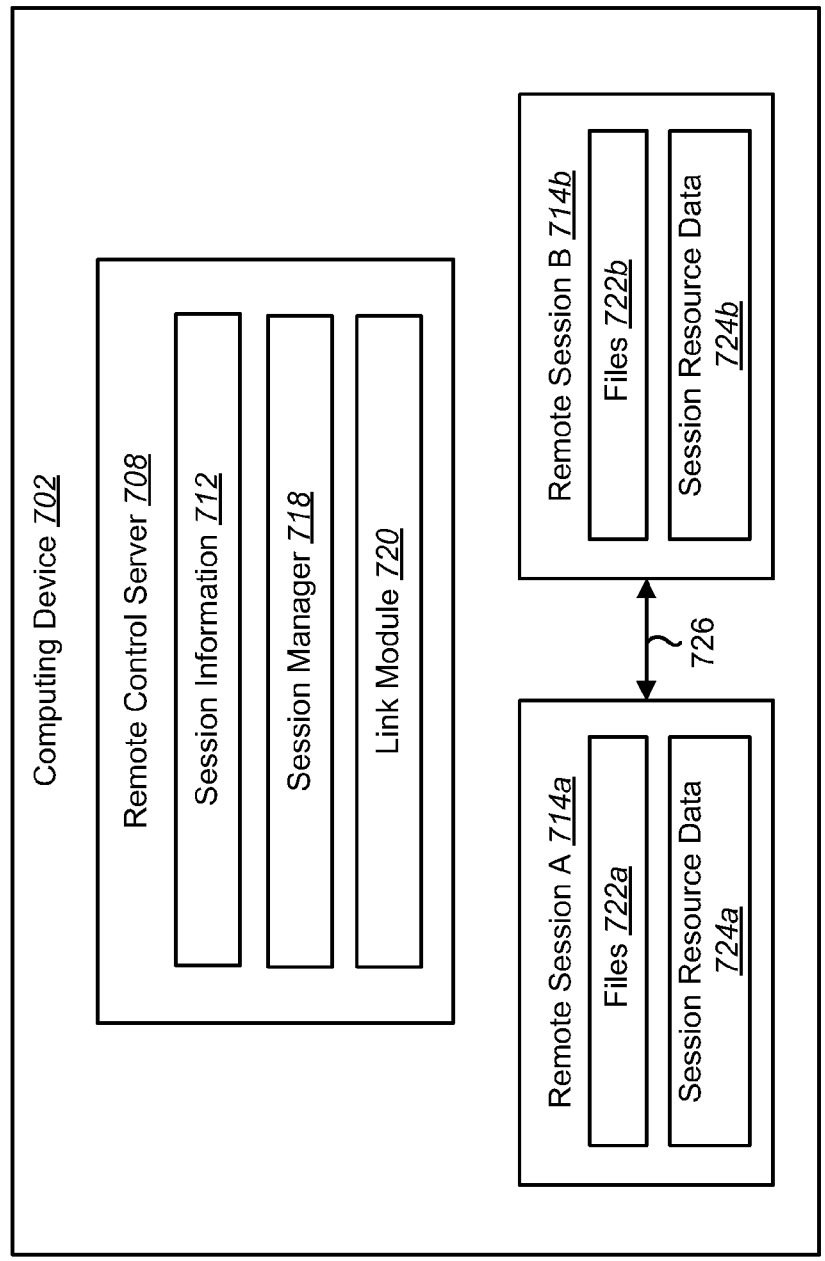
FIG. 7 is a block diagram illustrating one configuration of a computing device where systems and methods for establishing a direct connection between remote devices may be implemented.

FIG. 7 is a block diagram illustrating one configuration of a computing device 702 where systems and methods for establishing a direct connection between remote devices may be implemented. In some configurations, the computing device 702 may be similar to other corresponding elements described herein. The computing device 702 may include a remote control server 708. Similar to other corresponding elements, the remote control server 708 may include session information 712, a session manager 718 and a link module 720. Each of the remote control server 708, session information 712, session manager 718 and link module 720 may be similar to corresponding elements described herein with relation to other figures.

In some configurations, the computing device 702 may include one or more remote sessions 714 corresponding to one or more nodes on a network. In one example, the computing device 702 may be configured to establish remote session A 714a with corresponding files 722a or data (e.g. data or other information from a file other than the entire file), session resource data 724a and other data corresponding to remote session A 714a. The computing device 702 may also be configured to establish remote session B 714b with corresponding data files 722b, session resource data 724b and other data corresponding to remote session B 714b.

In one configuration, the computing device 702 may be configured to establish a direct link between one or more nodes for transmitting or sharing data between each of the nodes. In one configuration, the computing device 702 may establish a virtual link 726 between one or more remote sessions 714a-b to for facilitating sharing data between one or more devices. For example, the computing device 702 may establish a virtual link 726 between remote session A 714a and remote session B 714b. The computing device 702 may be configured to send instructions to one or more nodes or one or more agents on the nodes to transfer data between nodes as directed by the computing device 702. In one configuration, the instructions may be obtained pursuant to data transferred between remote session A 714a and remote session B 714b. In one example, where a file 722a is transferred from remote session A 714a to remote session B 714b over the virtual link 726, the computing device 702 may then instruct one or more nodes with a direct link to transfer or attempt to transfer some or all of a corresponding file from a first node to a second node over the direct link. In another configuration, where resource data 724a is shared between remote session A 714a and remote session B 714b over the virtual link 726, the computing device 702 may instruct one or more nodes to share corresponding resource data over a direct link between a first node and a second node. In other examples, the direct link between one or more devices may be configured to imitate sharing or transferring of data between one or more remote sessions 714 over a virtual link 726 managed by the computing device 702.

Figure 8:
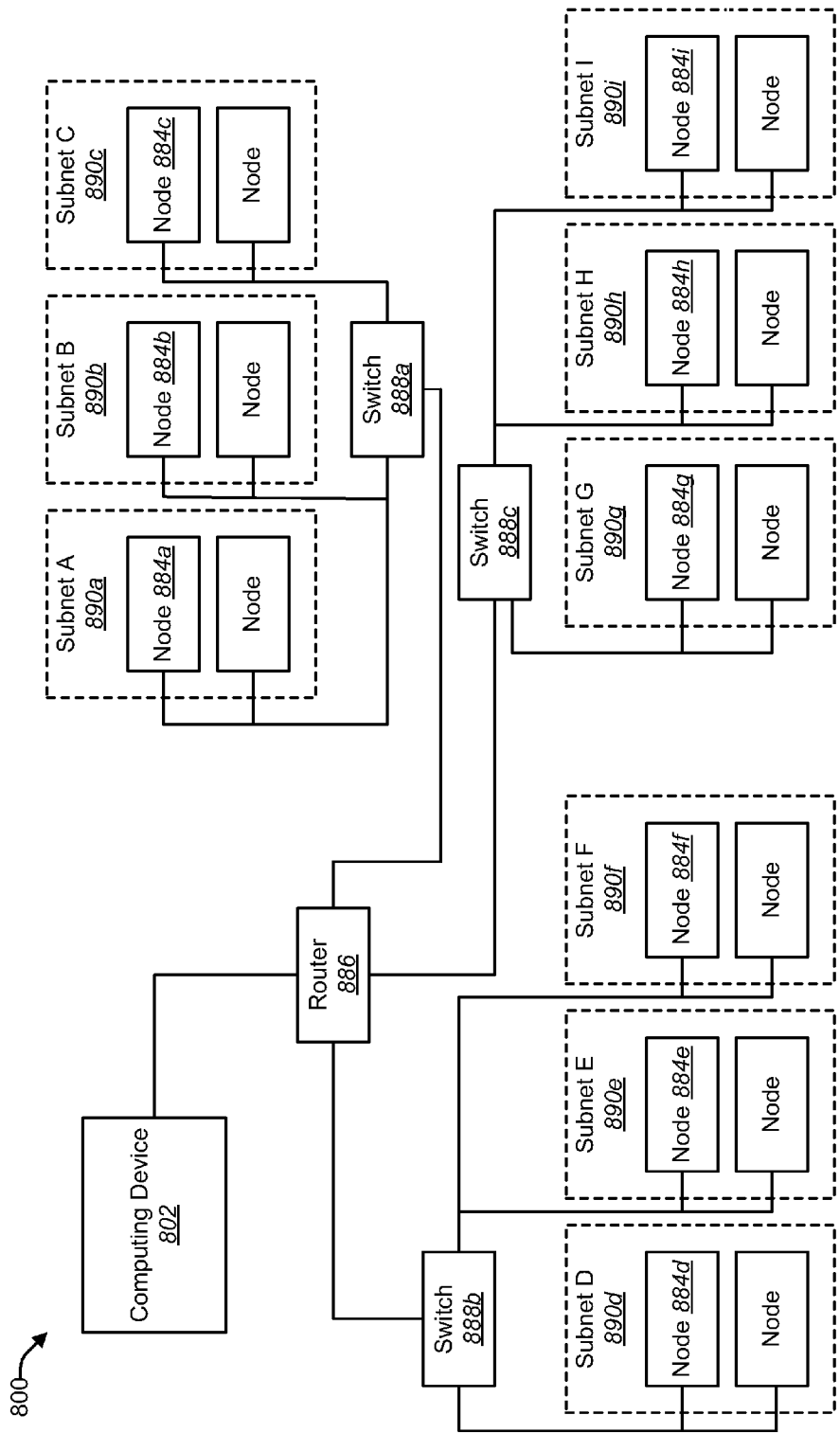
FIG. 8 is a block diagram that illustrates one configuration of a network where a system for establishing a direct connection between remote devices may be implemented.

FIG. 8 is a block diagram that illustrates one configuration of a network where a system 800 for establishing a direct connection between remote devices may be implemented. A computing device 802 is connected to a router 886. The router 886 is connected to switches 888a, 888b, 888c. The switch 888a is connected to several nodes 884a, 884b, 884c, etc. via their respective subnets 890a, 890b, 890c. The switch 888b is connected to several nodes 884d, 884e, 884f, etc. via their respective subnets 890d, 890e, 890f. The switch 888c is connected to several nodes 884g, 884h, 884i, etc. via their respective subnets 890g, 890h, 890i. Although FIG. 8 only shows one router 886, and a limited number of switches 888, subnets 890 and nodes 884, many and varied numbers of routers 886, switches 888, subnets 890 and nodes 884 may be included in networks and/or systems where systems and methods for establishing a direct connection between remote devices may be implemented. One or more of the nodes 884 illustrated in FIG. 8 may be examples of one or more of the nodes 106, 306, 606 described above.

Figure 9:
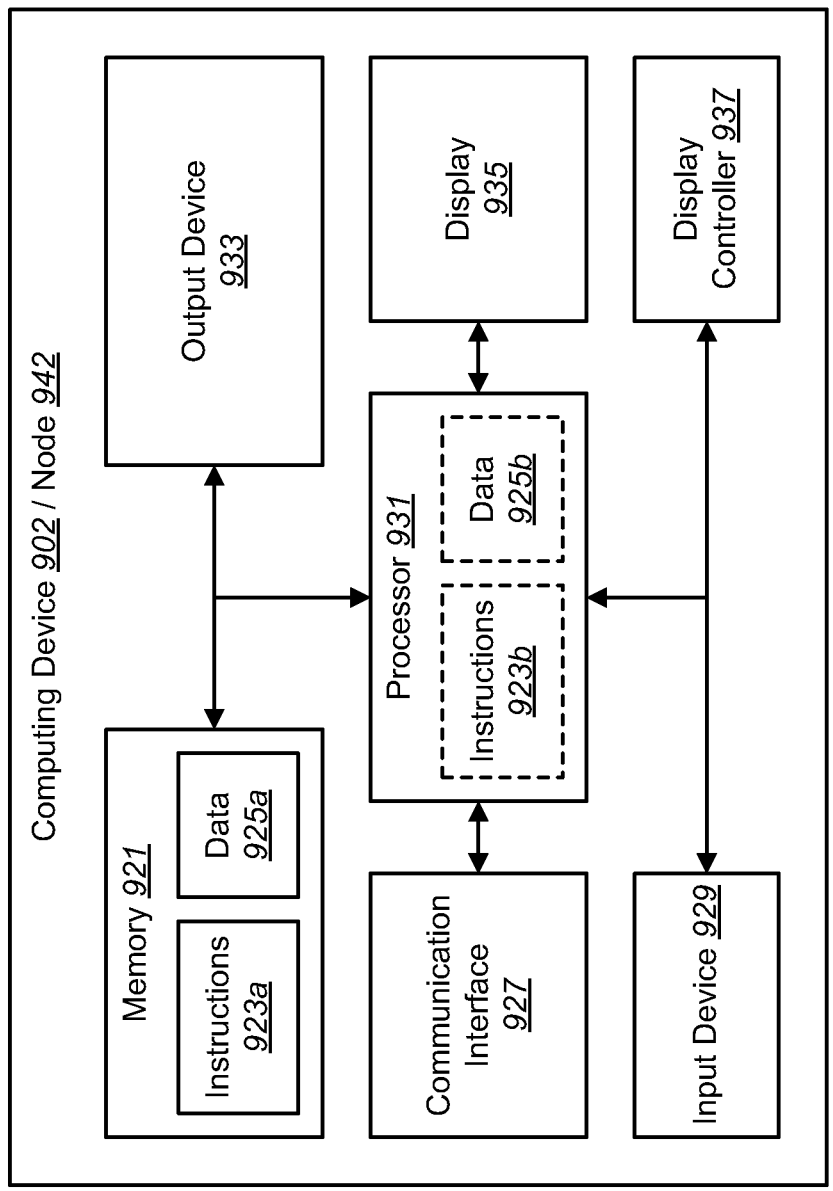
FIG. 9 is a block diagram that illustrates one configuration of a computing device and/or node that may be utilized for establishing a direct connection between remote devices.

FIG. 9 is a block diagram that illustrates one configuration of a computing device 902 and/or node 942 that may be utilized for establishing a direct connection between remote devices. The illustrated components may be located within the same physical structure or in separate housings or structures. One or more of the computing devices 102, 302, 602, 702, 802 and nodes 106, 306, 606, 884 described above may be implemented in accordance with the computing device 902 and/or node 942 illustrated in FIG. 9.

The computing device 902 and/or node 942 may include a processor 931 and memory 921. The memory 921 may include instructions 923*a* and data 925*a*. The processor 931 controls the operation of the administrative system 902 and/or node 942 and may be, for example, a microprocessor, a microcontroller, a digital signal processor (DSP) or other device known in the art. The processor 931 typically performs logical and arithmetic operations based on program instructions 923*b* and/or data 925*b* it loads from the memory 921. The instructions 923*a*-*b* may be executable by the processor to implement one or more of the methods 200, 400, 500, described above.

The computing device 902 and/or node 942 typically may include one or more communication interfaces 927 for communicating with other electronic devices. The communication interfaces 927 may be based on wired communication technology, wireless communication technology, or both. Examples of different types of communication interfaces 927 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 902 and/or node 942 typically may include one or more input devices 929 and one or more output devices 933. Examples of different kinds of input devices 929 include a keyboard, mouse, microphone, remote control device, button, joystick, trackball, touchpad, lightpen, etc. Examples of different kinds of output devices 933 include a speaker, printer, etc. One specific type of output device that may be typically included in a computer system is a display device 935. Display devices 935 used with configurations disclosed herein may utilize any suitable image projection technology, such as a cathode ray tube (CRT), liquid crystal display (LCD), light-emitting diode (LED), gas plasma, electroluminescence or the like. A display controller 937 may also be provided, for converting data stored in the memory 921 into text, graphics and/or moving images (as appropriate) shown on the display device 935.

Of course, FIG. 9 illustrates only one possible configuration of a computing device 902 and/or node 942. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A computing device configured to coordinate remote control sessions, comprising:
   a processor;
   memory in electronic communication with the processor; and
   instructions stored in memory, the instructions being executable to:
      create a first remote control session, by the computing device, corresponding to a first node, wherein the first remote control session permits the computing device to perform operations on the first node;
      create a second remote control session, by the computing device, corresponding to a second node, wherein the second remote control session permits the computing device to perform operations on the second node;
      determine whether to establish a direct link between the first and second nodes comprising determining whether the first remote control session and the second remote control session share a common connection other than a connection with the computing device; and
      establish a direct link between the first and second nodes if it is determined to establish a direct link.

2. The computing device of claim 1, wherein determining whether to establish a direct link between the first and second nodes further comprises determining whether the first node and the second node are on at least one of a group consisting of a same domain and a same subnet.

3. The computing device of claim 1, wherein determining whether to establish a direct link between the first and second nodes further comprises determining that the first and second nodes share a common network, wherein the computing device is not in direct communication with the common network.

4. The computing device of claim 1, wherein determining whether to establish a direct link between the first and second nodes further comprises determining whether a transfer of data satisfies a security criteria.

5. The computing device of claim 1, wherein determining whether to establish a direct link between the first and second nodes further comprises comparing a speed of the direct link to a speed of a network that the computing device uses for the remote control sessions.

6. The computing device of claim 1, wherein establishing a direct link between the first and second nodes comprises communicating remote control session information corresponding to the second remote control session to an agent on the first node.

7. The computing device of claim 1, wherein the instructions are further executable to send an instruction to the first node to share a file from the first node with the second node over the direct link.

8. The computing device of claim 1, wherein the instructions are further executable to:
   establish a virtual link between the first and second remote control sessions;
   share data between the first and second remote control sessions over the virtual link; and
   instruct the first and second nodes to share data over the direct link corresponding to the data shared between the first and second remote control sessions.

9. A method for coordinating remote control sessions implemented by a computing device, comprising:
   creating a first remote control session, by the computing device, corresponding to a first node, wherein the first remote control session permits the computing device to perform operations on the first node;
   creating a second remote control session, by the computing device, corresponding to a second node, wherein the second remote control session permits the computing device to perform operations on the second node;
   determining whether to establish a direct link between the first and second nodes comprising determining whether the first remote control session and the second remote control session share a common connection other than a connection with the computing device; and
   establishing a direct link between the first and second nodes if it is determined to establish a direct link.

10. The method of claim 9, wherein determining whether to establish a direct link between the first and second nodes further comprises determining whether the first node and the second node are on at least one of a group consisting of a same domain and a same subnet.

11. The method of claim 9, wherein determining whether to establish a direct link between the first and second nodes further comprises determining whether the first and second nodes share a common network, and wherein the computing device is not in direct communication with the common network.

12. The method of claim 9, wherein determining whether to establish a direct link between the first and second nodes further comprises determining whether a transfer of data satisfies a security criteria.

13. The method of claim 9, wherein establishing a direct link between the first and second nodes comprises sending an instruction to the first node to share resource information with the second node.

14. The method of claim 9, wherein establishing a direct link between the first and second nodes comprises communicating remote control session information corresponding to the second remote control session to an agent on the first node.

15. The method of claim 9, further comprising sending an instruction to the first node to share a file from the first node with the second node over the direct link.

16. The method of claim 9, further comprising:
   establishing a virtual link between the first and second remote control sessions;
   sharing data between the first and second remote control sessions over the virtual link; and
   instructing the first and second nodes to share data over the direct link corresponding to the data shared between the first and second remote control sessions.

17. A non-transitory tangible computer-readable medium for coordinating remote control sessions comprising executable instructions for:
- creating a first remote control session, by a computing device, corresponding to a first node, wherein the first remote control session permits the computing device to perform operations on the first node;
- creating a second remote control session, by the computing device, corresponding to a second node, wherein the second remote control session permits the computing device to perform operations on the second node;
- determining whether to establish a direct link between the first and second nodes comprising determining whether the first remote control session and the second remote control session share a common connection other than a connection with the computing device; and
- establishing a direct link between the first and second nodes if it is determined to establish a direct link.

18. The computer-readable medium of claim 17, wherein determining whether to establish a direct link between the first and second nodes further comprises determining whether the first node and the second node are on at least one of a group consisting of a same domain and a same subnet.

* * * * *